US012749385B2

(12) United States Patent
Bhattacharjee et al.

(10) Patent No.: US 12,749,385 B2
(45) Date of Patent: Sep. 29, 2026

(54) VARIABLE ALARM SETPOINTS AND PRIORITIES

(71) Applicant: Honeywell International Inc., Charlotte, NC (US)

(72) Inventors: Arnab Bhattacharjee, Bangalore (IN); Ioannis Tziatas, Witkoppen (ZA); Sreedhara Mallavarapu, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 38 days.

(21) Appl. No.: 18/921,285

(22) Filed: Oct. 21, 2024

(65) Prior Publication Data

US 2026/0112258 A1 Apr. 23, 2026

(51) Int. Cl.

*G08B 21/02* (2006.01)
*G08B 7/06* (2006.01)
*G08B 21/18* (2006.01)
*G08B 29/16* (2006.01)
*G05B 23/02* (2006.01)

(52) U.S. Cl.

CPC ............... *G08B 21/02* (2013.01); *G08B 7/06* (2013.01); *G08B 21/182* (2013.01); *G08B 29/16* (2013.01); *G05B 23/027* (2013.01)

(58) Field of Classification Search

CPC .......... G08B 21/02; G08B 7/06; G08B 29/16; G08B 21/182; G05B 23/027

See application file for complete search history.

(56) References Cited

U.S. PATENT DOCUMENTS 9,123,228 B2 * 9/2015 Morehead .............. G08B 29/14
9,721,455 B1 * 8/2017 Carr ........................ G04G 13/02
10,388,068 B2 * 8/2019 Park ....................... G06T 19/006
11,348,018 B2 5/2022 Rao et al.
2009/0027225 A1 * 1/2009 Farley ....................... G08B 7/06 340/6.11
2015/0022339 A1 * 1/2015 Matsuoka ............ G08B 25/008 340/506
2015/0061860 A1 * 3/2015 Pariyani ................ G06F 16/122 340/501

(Continued)

FOREIGN PATENT DOCUMENTS

WO 2018032061 A1 2/2018

OTHER PUBLICATIONS

CN 115306692 A (Year: 2022).*

*Primary Examiner* — Thomas D Alunkal
(74) *Attorney, Agent, or Firm* — Alston & Bird LLP

(57) ABSTRACT

Devices, methods, and systems for variable alarm setpoints and priorities are described herein. A method can include receiving, by a computing device, process data from equipment at an industrial site over a period of time, calculating, by the computing device, a rate of change of a process variable associated with a process at the industrial site based on the process data, updating, by the computing device, the rate of change of the process variable with the calculated rate of change, storing the updated rate of change of the process variable in memory of the computing device, determining, by the computing device, an alarm priority, an unsafe level, or an alarm limit based on the updated rate of change, and transmitting the alarm priority, the unsafe level, or the alarm limit to an event and alarm system.

20 Claims, 6 Drawing Sheets

(56) References Cited

U.S. PATENT DOCUMENTS

| | | | | |
|---|---|---|---|---|
| 2019/0041843 | A1* | 2/2019 | Cella | G05B 19/4185 |
| 2019/0076055 | A1* | 3/2019 | Karpenkop | G08B 21/02 |
| 2019/0187681 | A1 | 6/2019 | Cella et al. | |
| 2019/0384267 | A1* | 12/2019 | Krishnamurthy | G05B 19/4184 |
| 2020/0410843 | A1* | 12/2020 | Law | G08B 21/0446 |
| 2021/0108819 | A1* | 4/2021 | Chen | G01N 21/3504 |

* cited by examiner

VARIABLE ALARM SETPOINTS AND PRIORITIES

TECHNICAL FIELD

The present disclosure relates generally to devices, methods, and systems for variable alarm setpoints and priorities.

BACKGROUND

In the oil and gas refinery industry, event and alarm systems are used to notify an operator when a process is working outside its predetermined safe and/or optimum operating limits. When such a process alarm is triggered, the operator is supposed to take action(s) to bring parameters of the process back within the safe and/or optimum operating limits.

DETAILED DESCRIPTION

Figure 1:
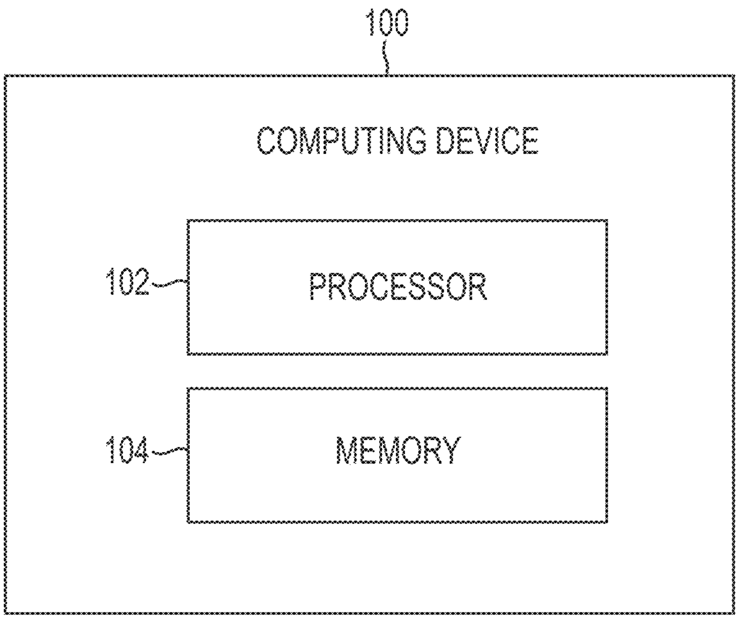
FIG. 1 illustrates a block diagram of a computing device in accordance with an embodiment of the present disclosure.

Devices, methods, and systems for variable alarm setpoints and priorities are described herein. A method can include receiving, by a computing device, process data from equipment at an industrial site over a period of time, calculating, by the computing device, a rate of change of a process variable associated with a process at the industrial site based on the process data, updating, by the computing device, the rate of change of the process variable with the calculated rate of change, storing the updated rate of change of the process variable in memory of the computing device, determining, by the computing device, an alarm priority, an unsafe level, or an alarm limit based on the updated rate of change, and transmitting the alarm priority, the unsafe level, or the alarm limit to an event and alarm system.

An expected response time for an operator of an event and alarm system can be based on a Process Safety Time (PST), which is the time a given process is expected to take before the process parameters reach an unacceptable or unsafe level ($P_{haz}$) from the Process Limit Value ($P_{limit}$). The PST can be calculated by dividing $P_{haz}$ minus the $P_{limit}$ by the estimated rate of change of the process variable. The shorter the PST time for a process alarm, the shorter the response time. The shorter the response time, the higher an alarm priority. For example, the alarm priority can be categorized as critical, high, medium, or low which determines the operator response time. Many of these processes can be critical in nature and the rate of change in those processes can vary significantly from one another.

Previous approaches use simulated environment and/or theoretical design data to set a lifetime static value for the estimated rate of change of the process variable. However, this value may not be accurate, and may end up changing over time, due to real life working conditions. For instance, the rate of change of the process variable can change due to equipment wear and tear, feed and catalyst quality, and/or environmental factors, among other factors.

The present disclosure provides a more accurate estimated rate of change of the process variable by calculating and updating the rate of change of the process variable to account for real life working conditions. The rate of change can be calculated at different operating regions, creating a piecewise linear approximation of the rate of change of the process variable over a wide range of data points. For example, the present disclosure can derive the estimated rate of change of the process variable near an alarm limit based on empirical evidence, refresh the value frequently to reflect the reality of the current process, determine where to set an alarm limit using the updated value, suggest a priority for the alarm, and/or suggest the process limit value for a given alarm and priority. This can be done for all alarms in a given alarm management system. Further, this process can be run on demand or on fixed schedules and is scalable to many alarm configurations.

As an example, process data from equipment (e.g., tags) at an industrial site can be received over a period of time, and a rate of change of a process variable associated with a process at the site can be calculated based on the process data. The rate of change of the process variable can be stored in memory of the computing device, and the updated rate of change can be used to determine an alarm priority, an unsafe level, or an alarm limit.

The alarm priority, the unsafe level, or the alarm limit can be transmitted to the event and alarm system. The event and alarm system can then use the alarm priority, the unsafe level, or the alarm limit to generate alarms. Further, a user can be notified of the updated rate of change.

In some examples, the rate of change in the process variable can be calculated more frequently by receiving a high frequency of tag data at a data processing platform, processing, enriching, and storing the tag data in a database, deriving the rate of change near an alarm set point and a maximum allowed working limit over different time periods and storing it to create a historical rate of change record. Further, an offline statistical analysis can be run to understand meaningful patterns of the historical rate of change record tag data. As the patterns are found in the statistical analysis, they can be stored and shared with the user and/or the event and alarm system to update the alarm priority or reset the limits.

When the information is shared, further analysis can be done on it to understand different characteristics like seasonality variations, clustering effect, dependent processes, etc. to uncover more patterns in the operation of the site. In some examples, the analysis can determine a rate of change for each process, a process safety time derivation, a process safety time based on projection and verification of value in the next scheduled analysis, an identification of processes where the derived process safety time is shifting over time, finding correlations or clusters of processes where the process safety time is shifting over time, uncovering any safety deviation in plant operation, and/or associating changing process parameters with alarm limits or priorities rather than fixed priorities or limits for alarms.

For each run of analysis, the process safety time can be compared for each alarm, and it can be verified if an appropriate alarm priority is assigned to each alarm. In case of a mismatch, either the alarm priority or the alarm limit value can be changed, assuming the maximum safe operating value remains the same.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIG. 2, and a similar element may be referenced as 320 in FIG. 3.

As used herein, "a", "an", or "a number of" something can refer to one or more such things, while "a plurality of" something can refer to more than one such things. For example, "a number of event and alarm systems" can refer to one or more event and alarm systems, while "a plurality of event and alarm systems" can refer to more than one event and alarm systems.

FIG. 1 illustrates a block diagram of a computing device 100 in accordance with an embodiment of the present disclosure. In some examples, the computing device 100 can be a cloud computing device. The computing device 100 can include a processor 102 and a memory 104. Memory 104 can be any type of storage medium that can be accessed by processor 102 to perform various examples of the present disclosure. For example, memory 104 can be a non-transitory computer readable medium having non-transitory machine-readable instructions (e.g., computer program instructions) stored thereon that are executable by processor 102 to perform various examples of the present disclosure.

For instance, processor 102 can execute the executable instructions stored in memory 104 to store a rate of change of a process variable associated with a process at an industrial site in the memory 104, receive process data from equipment at the industrial site over a period of time, calculate an updated rate of change of the process variable associated with the process at the industrial site based on the process data, store the updated rate of change of the process variable in the memory 104, determine an alarm priority, an unsafe level, or an alarm limit based on the updated rate of change, and transmit the alarm priority, the unsafe level, or the alarm limit to an event and alarm system.

Further, the instructions can cause the processor 102 to perform a statistical analysis on historical rate of change data including previously determined rate of change data, the rate of change of the process variable associated with the process at the industrial site, and the updated rate of change of the process variable associated with the process at the industrial site. In a number of embodiments, the processor 102 can identify a pattern in the historical rate of change data responsive to performing the statistical analysis.

The pattern can be a seasonality variation, a clustering effect, and/or a dependent process. The processor 102 can store the identified pattern in the memory 104 and/or transmit the identified pattern. For example, the identified pattern can be sent to a user device and/or to the event and alarm system to update the alarm priority, the unsafe level, or the alarm limit.

As an example, the shorter the process safety time for a process alarm, the shorter the response time. The shorter the response time, the higher the alarm priority for the alarm.

For instance, the alarm priority can be categorized as critical, high, medium, or low which determines the operator response time. A low alarm priority could allocate an operator two hours to resolve the alarm. A medium alarm priority could allocate an operator one hour, while a high alarm priority could allocate an operator thirty minutes. Lastly, a critical alarm priority could allocate an operator fifteen minutes to resolve the alarm. Of the alarms at an industrial site, one to five percent can be critical, five to ten percent can be high priority, ten to thirty percent can be medium, and thirty to fifty percent can be low priority, for example.

The alarm limit can be a threshold at which an alarm is triggered. For example, when the process variable reaches the alarm limit, an alarm can notify an operator. The alarm limit can be determined based on the rate of change of the process variable and/or the unsafe level.

Figure 2:
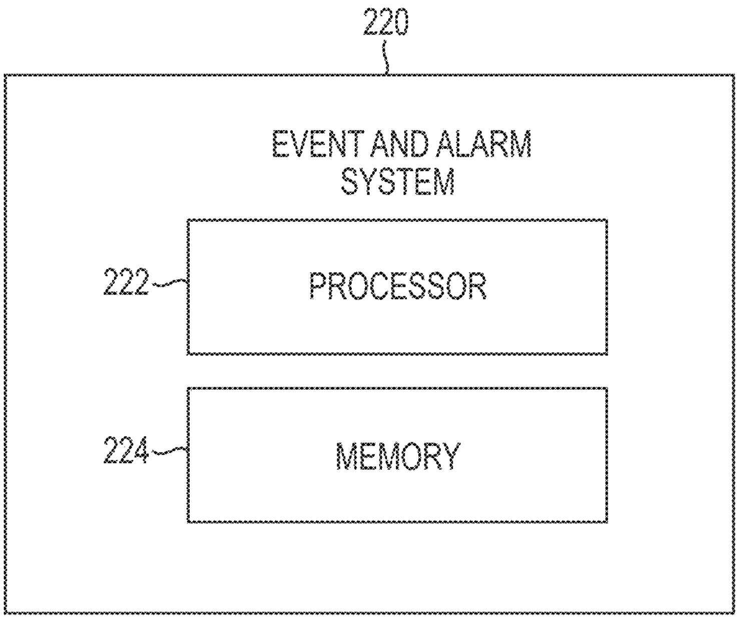
FIG. 2 illustrates a block diagram of an event and alarm system in accordance with an embodiment of the present disclosure.

FIG. 2 illustrates a block diagram of an event and alarm system 220 in accordance with an embodiment of the present disclosure. The event and alarm system 220 can monitor and/or control processes at an industrial site (e.g., an oil and gas refinery) by collecting process data from equipment at the site.

The event and alarm system 220 can notify a user (e.g., operator) device when a process at the site is operating outside its predetermined safe and/or optimum operating limits by, for instance, triggering a process alarm. When such a process alarm is triggered, the operator can take action to bring parameters of the process back within the safe and/or optimum operating limits.

The event and alarm system 220 can include a processor 222 and a memory 224. Memory 224 can be any type of storage medium that can be accessed by processor 222 to perform various examples of the present disclosure. For example, memory 224 can be a non-transitory computer readable medium having computer readable instructions (e.g., computer program instructions) stored thereon that are executable by processor 222.

For instance, processor 222 can execute the executable instructions stored in memory 224 to receive an alarm priority, an unsafe level, or an alarm limit at the event and alarm system 220. Further, the instructions can cause the event and alarm system 220 to compare the received alarm limit to an alarm limit. The event and alarm system 220 can reset the alarm limit to the received alarm limit responsive to the alarm limit and the received alarm limit being different.

Similarly, the event and alarm system 220 can compare the received alarm priority to an alarm priority. The event and alarm system 220 can update the alarm priority responsive to the alarm priority and the received alarm priority being different.

Figure 3:
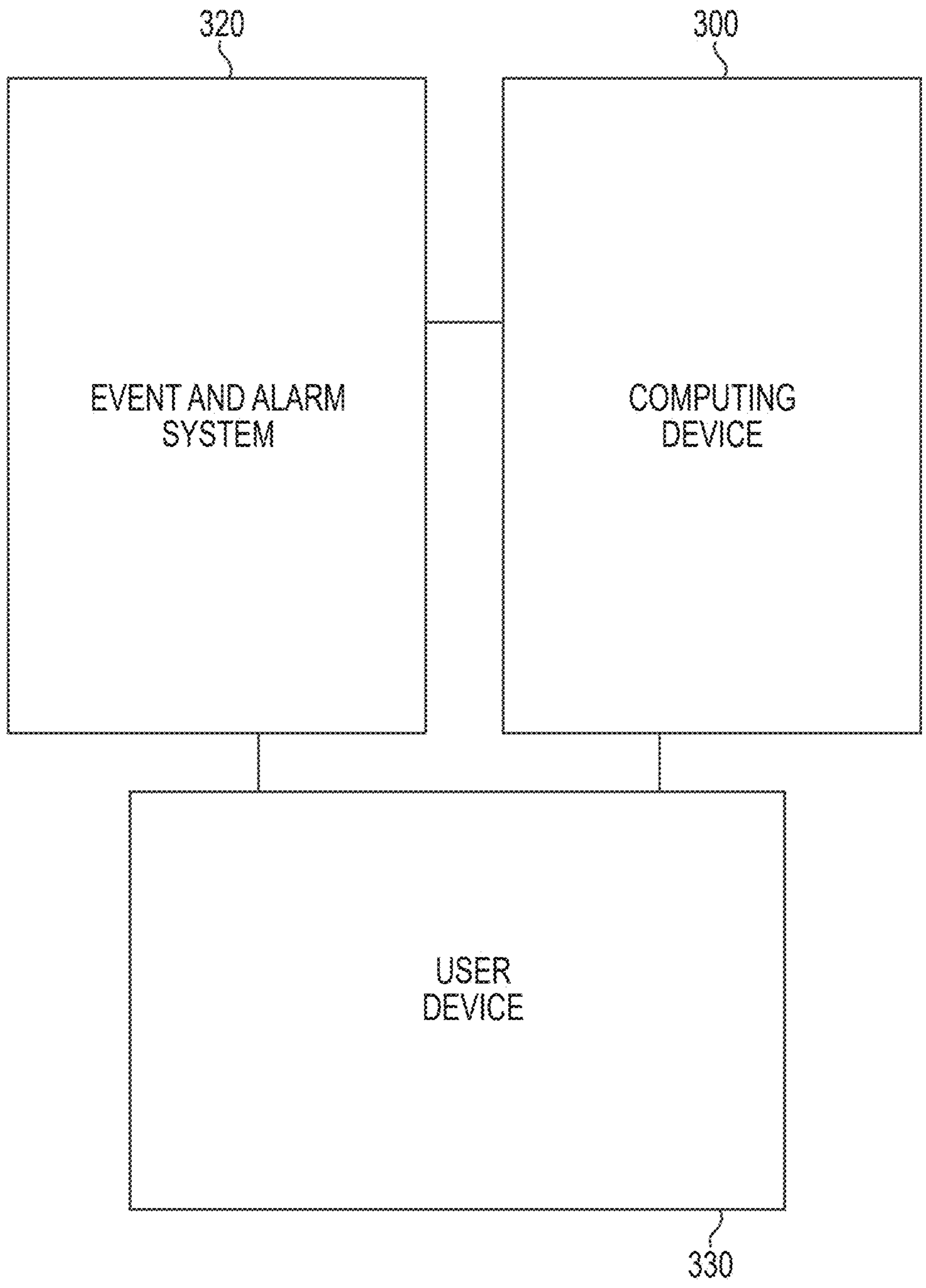
FIG. 3 illustrates a block diagram of an event and alarm system, a computing device, and a user device in accordance with an embodiment of the present disclosure.

FIG. 3 illustrates a block diagram of an event and alarm system 320, a computing device 300, and a user device 330 in accordance with an embodiment of the present disclosure. The event and alarm system 320 can correspond to event and alarm system 220 of FIG. 2. The computing device 300 can correspond to computing device 100 of FIG. 1. The computing device 300 can be communicatively coupled to the event and alarm system 320 and/or the user device 330.

The user device 330 can be, refer to, and/or include a laptop computer, desktop computer, wearable device, or mobile device, such as, for instance, a smart phone or tablet, among other types of computing devices. Although not illustrated in FIG. 3, the user device 330 can include a memory, processor, and user interface.

User device 330 can be used by a user (e.g., an operator or technician) to monitor and/or control processes at an industrial site. Further, user device 330 can receive (e.g., collect) data, such as, for instance, real-time process data from the site. Such data can include, for instance, current operational status, operational states, and/or properties of equipment and/or components at the industrial site. For example, the user device 330 can receive data from sensors of the event and alarm system 320 and/or any device monitoring processes.

The user device 330 can notify a user when a process is operating (e.g., working) outside its predetermined safe and/or optimum operating limits. For example, the user device 330 can display a message on the user interface of the user device 330. When such a process alarm is triggered (e.g., displayed), the operator can take action to bring parameters of the process back within the safe and/or optimum operating limits. In some embodiments, user device 330 can directly (e.g., without any intervening elements) monitor and control components or inputs of a process and can directly receive data from components of a process.

In some embodiments, user device 330 can monitor and control components and receive data from the computing device 300 and/or the event and alarm system 320 via a wired or wireless network (not shown in FIG. 3 for simplicity and so as not to obscure embodiments of the present disclosure). The network can be a network relationship through which the user device 330, the computing device 300, and/or the event and alarm system 320 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Figure 4:
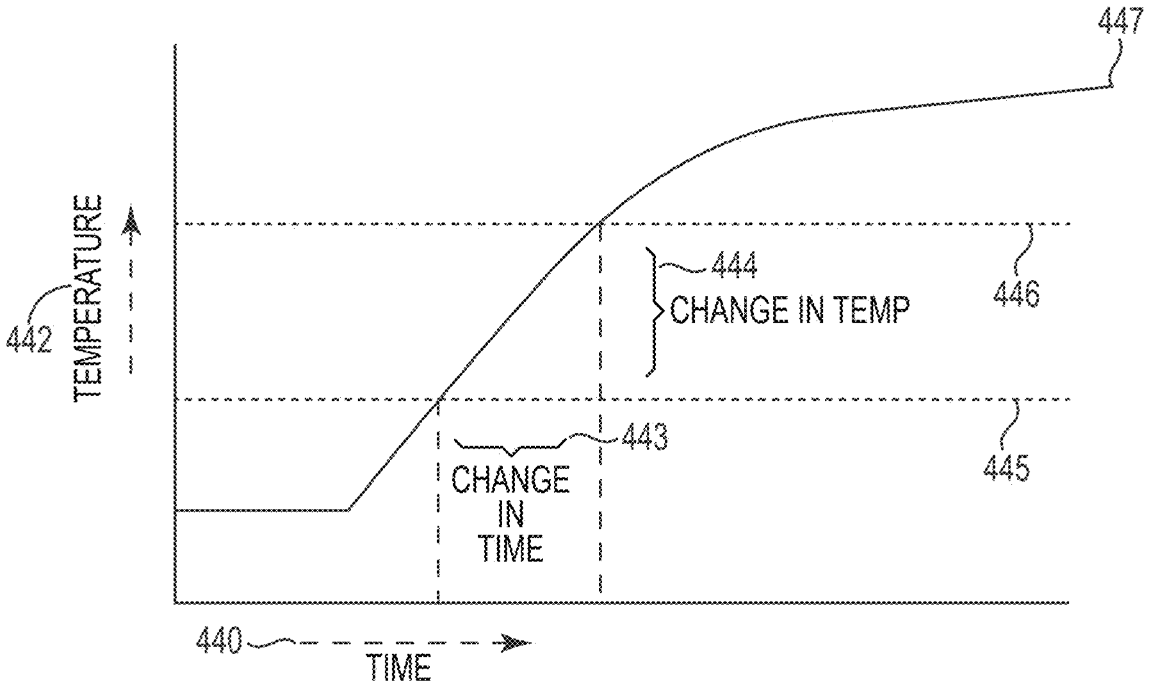
FIG. 4 illustrates a plot of example process data illustrating a rate of change of a process variable in accordance with an embodiment of the present disclosure.

FIG. 4 illustrates a plot (e.g., graph) of example process data 447 illustrating a rate of change of a process variable in accordance with an embodiment of the present disclosure. In the example illustrated in FIG. 4, the process variable is temperature 442 changing over time 440.

The rate of change can be a change in temperature 444 over a particular period of time 443. A computing device (e.g., computing device 100 and 300 of FIGS. 1 and 3, respectively) can calculate the rate of change of the process variable over the period of time by performing a straight line fit of the change of temperature 444 over the particular period of time 443 and determining the slope of the straight line fit.

The temperature 442 can be measured by a thermometer. The thermometer can measure the temperature of oil over time, for instance. Crude oil can be converted to other products at an oil refinery. For example, crude oil can be refined into gasoline, diesel, and/or jet fuel. Refining can include distillation, conversion, and treatment processes. One or more of these processes can include heating the oil.

A furnace of the oil refinery can heat the oil. An operator can set the furnace to heat the oil to a particular temperature based on which stage the oil is at in the refining process.

During crude distillation, the oil can be heated to between three hundred and seventy degrees to three hundred and eighty degrees Celsius. The oil can be heated to six hundred degrees Celsius during fractional distillation. Lastly, during cracking, the distilled product from the oil can be heated to four hundred and eight degrees Celsius to five hundred and forty degrees Celsius.

The oil can be running through a pipe at the oil refinery during or after the oil is heated by the furnace. An oil refinery can use a variety of pipes. Alloy steel pipes can be used for their strength, resistance to corrosion, and ability to withstand high temperatures. Alloy steel pipes can be rated between six hundred degrees Celsius and six hundred and seventy-five degrees Celsius. Stainless steel pipes also have a resistance to corrosion. In some instances, stainless steel pipes can withstand temperatures up to eight hundred and seventy degrees Celsius. Copper pressurized with nitrogen pipes can resist against the formation of harmful oxides. These pipes can be rated for temperatures up to around two hundred and five degrees Celsius.

The rate of change of a process variable depends on multiple factors and can change over time in real life working conditions based on a number of factors. The rate of change of a process variable can change significantly over time based on equipment wear and tear, feed and catalyst quality, and/or environmental factors. For example, pipes and tanks can corrode over time, which can cause the rate of change of temperature 442 to change.

Although pipes can be rated for different temperatures based on their material type, over time these ratings may no longer be accurate due to degradation. Heat rating degradation can be different for different types of pipe. For example, an alloy steel pipe may degrade slower than a stainless steel pipe.

The unsafe level 446 can originally be set based on data from an equipment data sheet. Pipes in oil refineries can degrade over time due to a number of factors, including transporting corrosive and/or combustible liquids and gases. As such, the unsafe level 446 can drop as the pipe rating drops due to degradation of the pipe over time. However, if the unsafe level 446 and/or the alarm limit 445 are not changed over time, the response time for the operator to bring the process back within safe and/or optimum operating limits may not be enough.

The computing device can calculate a rate of change of a process variable over time to prevent this from happening. As previously discussed, a computing device can determine an unsafe level 446 and/or an alarm limit 445 based on the rate of change of the process variable. An expected response time for an operator to bring the process back within safe and/or optimum operating limits is based on a process safety time, which is the time a given process is expected to take before the process parameters reach the unsafe level 446 from the process limit.

The process safety time can be calculated by dividing the unsafe level 446 minus the process limit by the rate of change of the process variable. The alarm limit 445 can be set based on the process safety time and/or the rate of change.

The shorter the process safety time for a process alarm, the shorter the response time. The shorter the response time, the higher an alarm priority. The alarm priority can be categorized as critical, high, medium, or low which determines the operator response time. For example, a low alarm priority could allocate an operator two hours to resolve the issue. A medium alarm priority could allocate an operator one hour, while a high alarm priority could allocate an operator thirty minutes. Lastly, a critical alarm priority could allocate an operator fifteen minutes to resolve the issue. Of the alarms at an industrial site, one to five percent can be critical, five to ten percent can be high priority, ten to thirty percent can be medium, and thirty to fifty percent can be low priority, for example.

The computing device can transmit the unsafe level 446, the alarm limit 445, and/or the alarm priority. In some examples, the computing device can transmit the unsafe level 446, the alarm limit 445, and/or the alarm priority to an event and alarm system (e.g., event and alarm system 220 and 320 of FIGS. 2 and 3, respectively). The event and alarm system can update the unsafe level 446, the alarm limit 445, and/or the alarm priority. Further, the event and alarm system can update the process safety time based on the updated unsafe level 446 and/or alarm limit 445.

In a number of embodiments, the computing device can notify a user (e.g., operator) of the updated rate of change of the process variable. For example, the computing device can transmit the updated rate of change of the process variable to a user device (e.g., user device 330 of FIG. 3). The user device can display the updated rate of change of the process variable on a user interface.

In a number of embodiments, the computing device can perform a statistical analysis on historical rate of change data including the rate of change of the process variable. In some examples, a pattern can be identified in the historical rate of change data from the statistical analysis. The pattern can be a seasonality variation, a clustering effect, or a dependent process. For example, in winter, the temperature of the oil running through the pipes may decrease. This could be identified as a seasonality variation.

Although the process variable illustrated in FIG. 4 is temperature, the process variable could be any measurable process input, byproduct, or output. For instance, the process variable could be a pressure, an amplitude, a flow rate, a speed, vibration, oscillation, a quality, a quantity, or a level of processing equipment. In a number of embodiments, the processing equipment could be, but is not limited to, a pump, valve, compressor, tank, furnace, heat exchanger, distillation column, and/or pipe.

In a number of embodiments, the rate of change can be a change in pressure over a particular period of time. A computing device can calculate the rate of change of the pressure by performing a straight line fit of the change of pressure over the particular period of time and determining the slope of the straight line fit.

The pressure can be measured by a pressure sensor. The pressure sensor can measure pressure over time. A variety of gases can be stored in tanks at a gas refinery. For example, refined gas products like propane, butane, and natural gas can be stored at a gas refinery in tanks. Each of these gas products has different vapor pressure and therefore require different storage pressures.

An operator can set a storage pressure of a tank for a particular gas to a particular pressure based on the type of gas. The storage pressure in tanks at a gas refinery can vary from several hundred to several thousand pounds per square inch (PSI). Some high-pressure storage tanks can reach pressures as high as three hundred and sixty pounds per square inch depending on the type of gas and its vapor pressure at the storage temperature.

The rate of change of the storage pressure can change over time due to equipment wear and/or environmental factors. For example, the storage pressure can increase or decrease in response to a seal, gasket, valve, auxiliary system degradation or weld failure on the storage tank, auxiliary system degradation, or a change in ambient temperature.

Due to a change in ambient temperature, the storage pressure of a gas can increase or decrease uncontrollably. As such, an unsafe level can change as the storage pressure fluctuates due to the change in ambient temperature over time. However, if the unsafe level and/or the alarm limit are not changed over time, the response time for the operator to bring the process back within safe and/or optimum operating limits may not be enough.

The computing device can calculate a rate of change of the storage pressure over time to prevent this from happening. The computing device can determine an unsafe level and/or an alarm limit for the storage pressure based on the rate of change of the storage pressure. An expected response time for an operator to bring the storage pressure back within safe and/or optimum operating limits is based on a process safety time, which is the time it will take for the storage pressure to reach the unsafe level from the process limit.

The process safety time for the storage pressure can be calculated by dividing the unsafe level of the storage pressure minus the process limit of the storage pressure by the rate of change of the storage pressure. The alarm limit of the storage pressure can be set based on the process safety time of the storage pressure and/or the rate of change of the storage pressure.

The shorter the process safety time for the storage pressure, the shorter the response time to bring the storage pressure back to the safe and/or optimum storage pressure. The shorter the response time for the storage pressure, the higher an alarm priority for the storage pressure. For example, if an operator is afforded (e.g., allowed) two hours to bring the storage pressure back to the safe and/or optimum storage pressure, a low alarm priority could be assigned to the storage pressure. If an operator is afforded one hour to bring the storage pressure back to the safe and/or optimum storage pressure, a medium alarm priority could be assigned to the storage pressure. If an operator is afforded thirty minutes to bring the storage pressure back to the safe and/or optimum storage pressure, a high alarm priority could be assigned to the storage pressure. If an operator is afforded fifteen minutes to bring the storage pressure back to the safe and/or optimum storage pressure, a critical alarm priority could be assigned to the storage pressure.

The computing device can transmit the unsafe level of the storage pressure, the alarm limit of the storage pressure, and/or the alarm priority of the storage pressure. In some examples, the computing device can transmit the unsafe level of the storage pressure, the alarm limit of the storage pressure, and/or the alarm priority of the storage pressure to an event and alarm system. The event and alarm system can update the unsafe level of the storage pressure, the alarm limit of the storage pressure, and/or the alarm priority of the storage pressure. Further, the event and alarm system can update the process safety time based on the updated unsafe level and/or alarm limit of the storage pressure. In a number of embodiments, the computing device can notify a user of the updated rate of change of the storage pressure.

In a number of embodiments, the computing device can perform a statistical analysis on historical rate of change data including the rate of change of the storage pressure. In some examples, a pattern can be identified in the historical rate of change data from the statistical analysis. The pattern can be a seasonality variation, a clustering effect, or a dependent process. For example, a storage pressure in one tank may be rapidly changing at the same rate as storage pressures in other tanks containing the same gas. This could be identified as a clustering effect.

In some examples, the rate of change can be a change in flow rate over a particular period of time. A computing device can calculate the rate of change of the process variable by performing a straight line fit of the change in flow rate over the particular period of time and determining the slope of the straight line fit.

The flow rate can be measured by a flow sensor. The flow sensor can measure flow rate over time. The transportation of crude oil and other chemicals through an oil refinery can be controlled by valves. For example, crude oil and other chemicals can pass through an open valve, slowed down at a partially opened valve, or stopped at a closed valve.

Valves at an oil refinery can include, but are not limited to control valves, gate valves, globe valves, and butterfly valves. A control valve can control flow rate, pressure, and temperature and can be operated remotely with real-time adjustments using sensors and actuators. A gate valve can be used to maintain and control flow rate. When fully opened, a gate valve, can ensure unobstructed passage of the crude oil and other chemicals. A globe valve can be used for precise pressure control and can create a significant pressure drop due to their S-shaped passageway. A butterfly valve includes a circular disc mounted on a rod to manipulate fluid flow. When the butterfly valve is open, the disc rotates allowing fluid to pass and when the valve is closed, the disc blocks off flow of the crude oil and other chemicals.

The fluid flow of the crude oil and other chemicals can be controlled by an operator. For example, a valve can be remotely controlled by the operator using hydraulic, pneumatic, and/or electrical signals.

In a number of embodiments, an operator can set a fluid rate of crude oil flowing through the valve. The flow rate can be expressed as gallons per minute, barrels per minute, or cubic meters per minute.

The rate of change of the flow rate can change over time due to equipment wear and/or environmental factors. For example, the flow rate can increase or decrease in response to a faulty valve. In a number of embodiments, valve failures can be caused by corrosion, obstructions, and/or manufacturing defects.

Due to valve failures, the flow rate of crude oil can increase or decrease uncontrollably. As such, an unsafe level can change as the flow rate fluctuates due to degradation of the valve over time. However, if the unsafe level and/or the alarm limit are not changed over time, the response time for the operator to bring the flow rate back within safe and/or optimum operating limits may not be enough.

The computing device can calculate a rate of change of the flow rate over time to prevent this from happening. The computing device can determine an unsafe level and/or an alarm limit for the flow rate based on the rate of change of the flow rate. An expected response time for an operator to bring the flow rate back within safe and/or optimum operating limits is based on a process safety time, which is the time it will take for the flow rate to reach the unsafe level from the process limit.

The process safety time for the flow rate can be calculated by dividing the unsafe level of the flow rate minus the process limit of the flow rate by the rate of change of the flow rate. The alarm limit of the flow rate can be set based on the process safety time of the flow rate and/or the rate of change of the flow rate.

The shorter the process safety time for the flow rate, the shorter the response time to bring the flow rate back to the safe and/or optimum flow rate. The shorter the response time for the flow rate, the higher an alarm priority for the flow rate. For example, if an operator is afforded two hours to bring the flow rate back to the safe and/or optimum flow rate, a low alarm priority could be assigned to the flow rate. If an operator is afforded one hour to bring the flow rate back to the safe and/or optimum flow rate, a medium alarm priority could be assigned to the flow rate. If an operator is afforded thirty minutes to bring the flow rate back to the safe and/or optimum flow rate, a high alarm priority could be assigned to the flow rate. If an operator is afforded fifteen minutes to bring the flow rate back to the safe and/or optimum flow rate, a critical alarm priority could be assigned to the flow rate.

The computing device can transmit the unsafe level of the flow rate, the alarm limit of the flow rate, and/or the alarm priority of the flow rate. In some examples, the computing device can transmit the unsafe level of the flow rate, the alarm limit of the flow rate, and/or the alarm priority of the flow rate to an event and alarm system. The event and alarm system can update the unsafe level of the flow rate, the alarm limit of the flow rate, and/or the alarm priority of the flow rate. Further, the event and alarm system can update the process safety time based on the updated unsafe level and/or alarm limit of the flow rate. In a number of embodiments, the computing device can notify a user of the updated rate of change of the flow rate.

In a number of embodiments, the computing device can perform a statistical analysis on historical rate of change data including the rate of change of the flow rate. In some examples, a pattern can be identified in the historical rate of change data from the statistical analysis. The pattern can be a seasonality variation, a clustering effect, or a dependent process. For example, a flow rate of crude oil through a valve may be more rapidly changing than a flow rate of crude oil through a different valve. This could be identified as a dependent process.

Figure 5:
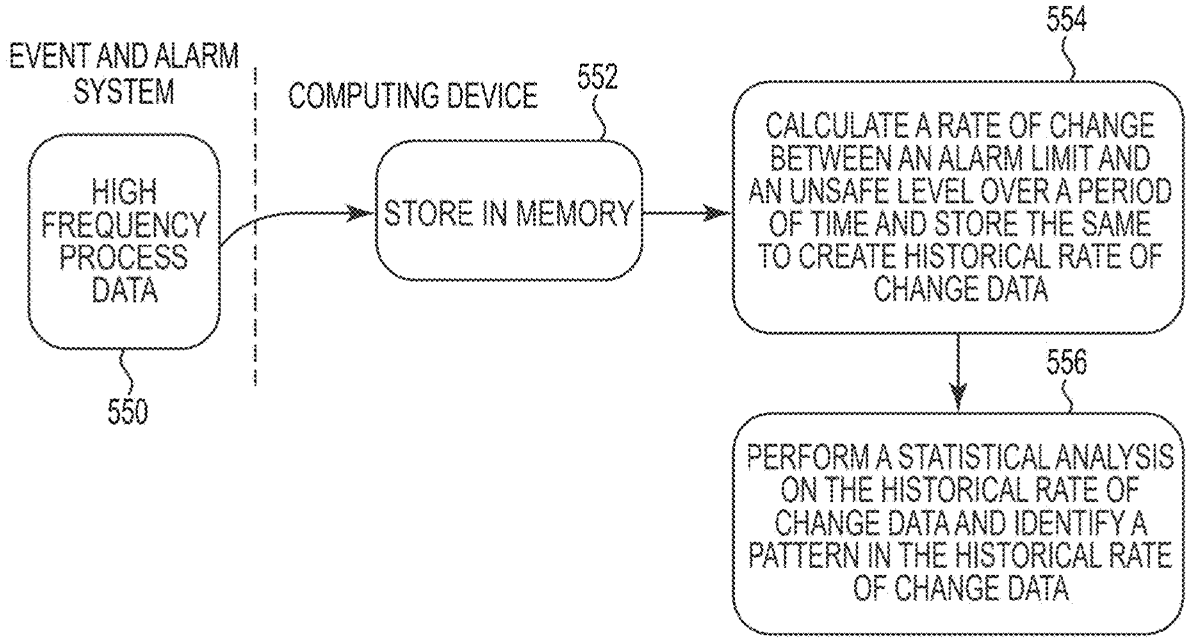
FIG. 5 illustrates an example of a method for calculating a rate of change of a process variable in accordance with an embodiment of the present disclosure.

FIG. 5 illustrates an example of a method for calculating a rate of change of a process variable in accordance with an embodiment of the present disclosure.

At block 550, an event and alarm system (e.g., event and alarm system 220 and 320 of FIGS. 2 and 3, respectively) can frequently collect process data from equipment at an industrial site. For example, the event and alarm system can continuously, periodically, or after a period of time collect process data. The process data can be continuously transmitted or transmitted periodically or after the short period of time.

A computing device (e.g., computing device 100 and 300 of FIGS. 1 and 3, respectively) can receive the process data from the event and alarm system. The event and alarm system can receive the process data from equipment at an industrial site including sensors. At block 552, the process data can be stored in memory (e.g., memory 104 of FIG. 1) of the computing device.

The computing device can calculate a rate of change between an alarm limit and an unsafe level over a period of time using the received process data at block 554. Further, the computing device can store the calculated rate of change to create historical rate of change data. The calculated rate of change along with the historical rate of change data can be stored in the memory of the computing device.

At block 556, the computing device can perform a statistical analysis on the historical rate of change data. In some examples, the statistical analysis can identify a pattern in the historical rate of change data.

Figure 6:
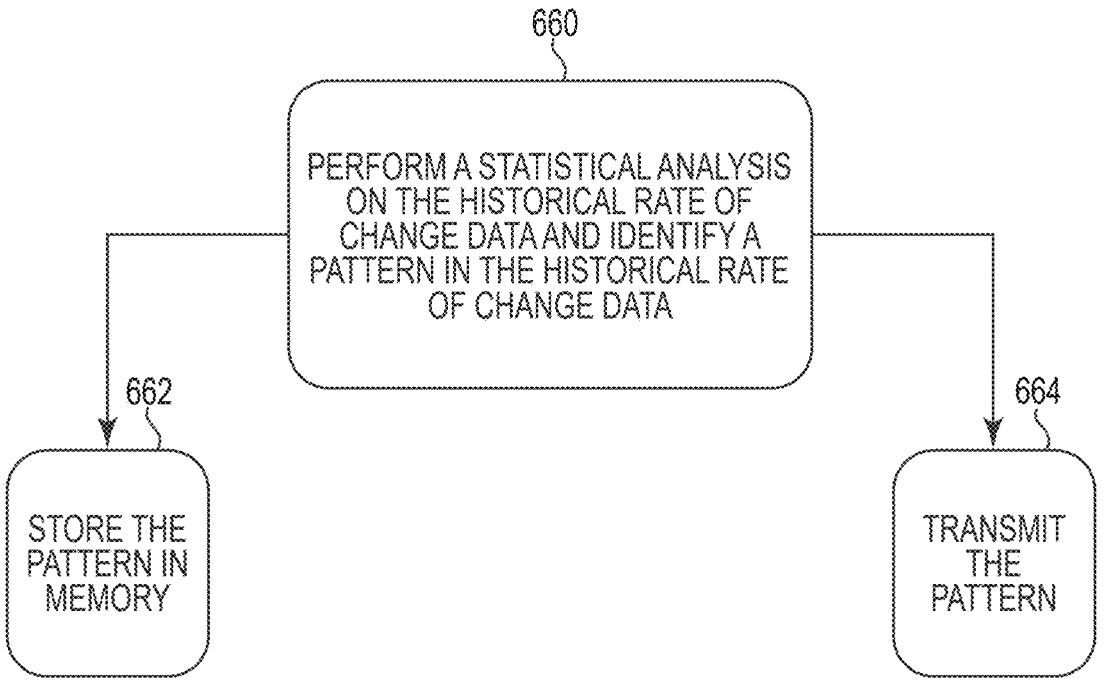
FIG. 6 illustrates an example of a method for performing a statistical analysis on historical rate of change data in accordance with an embodiment of the present disclosure.

FIG. 6 illustrates an example of a method for performing a statistical analysis on historical rate of change data in accordance with an embodiment of the present disclosure. The statistical analysis can be performed by a computing device (e.g., computing device 100 and 300 of FIGS. 1 and 3, respectively).

At block 660, the computing device can perform the statistical analysis on the historical rate of change data and identify a pattern in the historical rate of change data. The identified pattern can be a seasonality variation, a clustering effect, or a dependent process, for example, as previously described herein.

The computing device can store the identified pattern in memory at block 662. For example, the computing device can store the identified pattern in memory (e.g., memory 104 of FIG. 1) of the computing device.

At block 664, the computing device can transmit the identified pattern. For example, the identified pattern can be transmitted to a user or to an event and alarm system (e.g., event and alarm system 220 and 320 of FIGS. 2 and 3, respectively).

The identified pattern can be transmitted to a user device (e.g., user device 330 of FIG. 3). The user device can display the identified pattern on a user interface of the user device to notify the user of the identified pattern. The user or the event and alarm system can update an alarm priority, an unsafe level, or an alarm limit in response to receiving the identified pattern.

Figure 7:
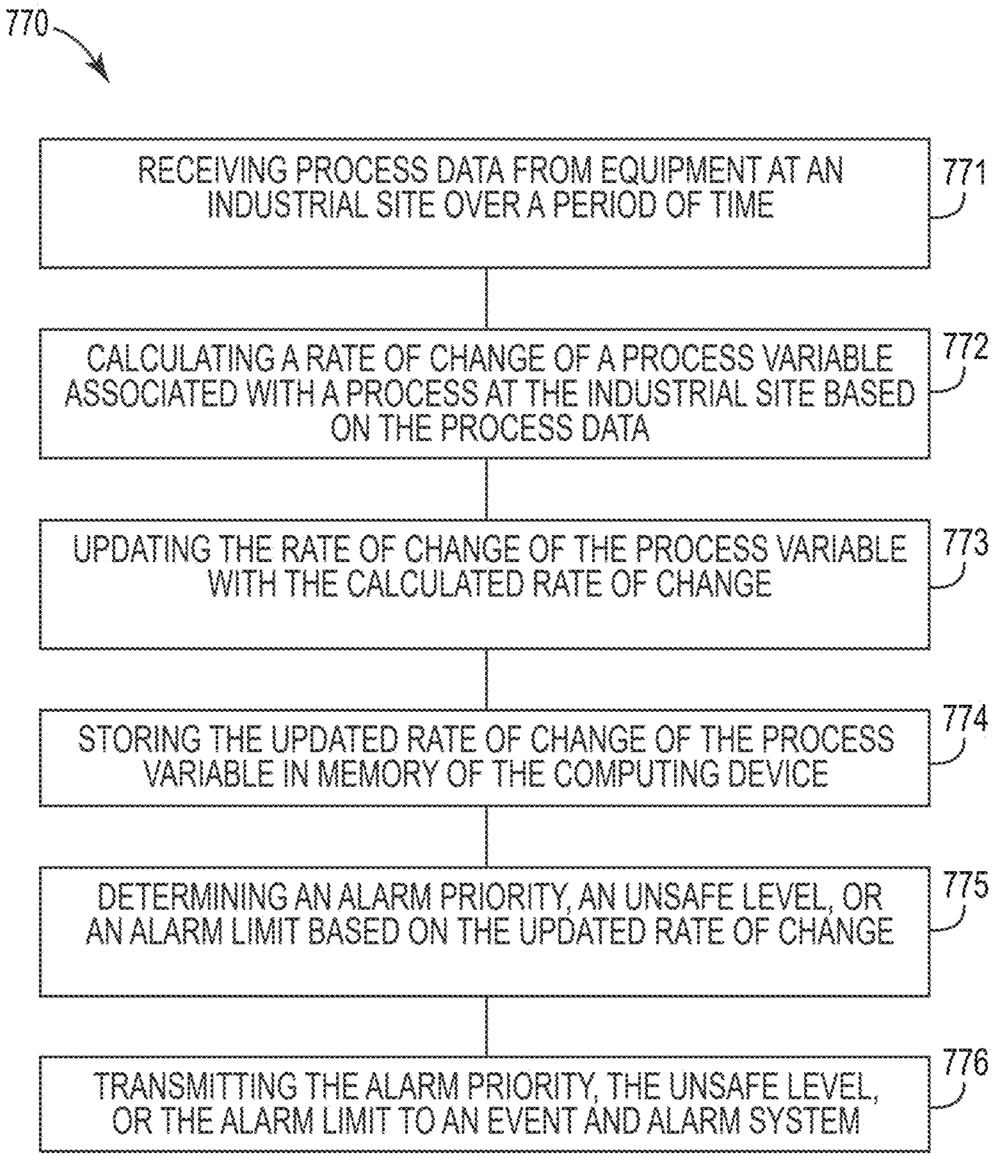
FIG. 7 illustrates an example of a method for variable alarm setpoints and priorities in accordance with an embodiment of the present disclosure.

FIG. 7 illustrates an example of a method 770 for variable alarm setpoints and priorities in accordance with an embodiment of the present disclosure. Method 770 can be performed by, for example, computing device 100 and/or 300 previously described in connection with FIGS. 1 and 3, respectively.

At block 771, method 770 includes receiving process data from equipment at an industrial site over a period of time. The equipment can be pumps, furnaces, heat exchangers, distillation columns, valves, and/or tanks, for example. In a number of embodiments, the industrial site can be an oil or gas refinery, as previously described herein.

At block 772, method 770 includes calculating a rate of change of a process variable associated with a process at the industrial site based on the process data. The process variable could be an oil temperature, for example.

At block 773, method 770 includes updating the rate of change of the process variable with the calculated rate of change. In some examples, a user via a user device (e.g., user device 330 of FIG. 3) can be notified of the updated rate of change of the process variable.

At block 774, method 770 includes storing the updated rate of change of the process variable in memory of the computing device. The memory can be memory 104 previously described in connection with FIG. 1.

At block 775, method 770 includes determining an alarm priority, an unsafe level, or an alarm limit based on the updated rate of change. For example, a pipe the oil is traveling through may be rated for oil up to four hundred degrees Celsius. Accordingly, in this example, the unsafe level can be set to four hundred degrees Celsius and the alarm limit can be calculated based on the time it would take the temperature to reach the unsafe level based on the updated rate of change.

At block 776, method 770 includes transmitting the alarm priority, the unsafe level, or the alarm limit to an event and alarm system (e.g., event and alarm system 220 and 320 of FIGS. 2 and 3, respectively). Further, the method can include the event and alarm system updating a safety time associated with the process based on the unsafe level. Using the updated safety time, the event and alarm system, can determine when to generate an alarm.

In some examples, the method 770 can further include the event and alarm system updating the alarm priority responsive to receiving the alarm priority. The event and alarm system can determine when to generate an alarm for the process using the updated alarm priority.

The shorter the process safety time for a process alarm, the shorter the response time. The shorter the response time, the higher an alarm priority. For example, the alarm priority can be categorized as critical, high, medium, or low which determines the operator response time. A low alarm priority could allocate an operator two hours to resolve the issue. A medium alarm priority could allocate an operator one hour, while a high alarm priority could allocate an operator thirty minutes. Lastly, a critical alarm priority could allocate an operator fifteen minutes to resolve the issue. Of the alarms at an industrial site, one to five percent can be critical, five to ten percent can be high priority, ten to thirty percent can be medium, and thirty to fifty percent can be low priority, for example.

The method 770 can further include updating, at the event and alarm system, the alarm limit responsive to receiving the alarm limit. The event and alarm system can determine when to generate an alarm for the process using the updated alarm limit.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, by a computing device, process data from equipment at an industrial site over a period of time;
calculating, by the computing device, a rate of change of a process variable associated with a process at the industrial site based on the process data;
updating, by the computing device, the rate of change of the process variable with the calculated rate of change;
storing the updated rate of change of the process variable in memory of the computing device;
determining, by the computing device, an alarm priority, an unsafe level, or an alarm limit based on the updated rate of change;
transmitting, by the computing device, the alarm priority, the unsafe level, or the alarm limit to an event and alarm system; and
causing the event and alarm system to generate an alarm for the process based on the transmitted alarm priority, unsafe level, or alarm limit, in real time during operation of the process.

2. The method of claim 1, further comprising updating, by the event and alarm system, a safety time associated with the process based on the unsafe level.

3. The method of claim 2, further comprising determining, by the event and alarm system, when to generate the alarm for the process using the updated safety time.

4. The method of claim 1, further comprising updating, at the event and alarm system, the alarm priority responsive to receiving the alarm priority.

5. The method of claim 4, further comprising determining, by the event and alarm system, when to generate the alarm for the process using the updated alarm priority.

6. The method of claim 1, further comprising updating, at the event and alarm system, the alarm limit responsive to receiving the alarm limit.

7. The method of claim 6, further comprising determining, by the event and alarm system, when to generate the alarm for the process using the updated alarm limit.

8. The method of claim 1, further comprising notifying, by the computing device, a user of the updated rate of change of the process variable.

9. A computing device, comprising:
a processor; and
a memory storing non-transitory machine-readable instructions to cause the processor to:
store a rate of change of a process variable associated with a process at an industrial site in the memory;
receive process data from equipment at the industrial site over a period of time;
calculate an updated rate of change of the process variable associated with the process at the industrial site based on the process data;
store the updated rate of change of the process variable in the memory;
determine an alarm priority, an unsafe level, or an alarm limit based on the updated rate of change;
transmit the alarm priority, the unsafe level, or the alarm limit to an event and alarm system; and
cause the event and alarm system to generate an alarm for the process based on the transmitted alarm priority, unsafe level, or alarm limit, in real time during operation of the process.

10. The computing device of claim 9, wherein the instructions cause the processor to perform a statistical analysis on historical rate of change data including the rate of change of the process variable associated with the process at the industrial site and the updated rate of change of the process variable associated with the process at the industrial site.

11. The computing device of claim 10, wherein the instructions cause the processor to identify a pattern in the historical rate of change data responsive to performing the statistical analysis.

12. The computing device of claim 11, wherein the instructions cause the processor to store the identified pattern in the memory.

13. The computing device of claim 11, wherein the instructions cause the processor to transmit the identified pattern to a user device.

14. The computing device of claim 11, wherein the instructions cause the processor to transmit the identified pattern to the event and alarm system to update the alarm priority, the unsafe level, or the alarm limit.

15. The computing device of claim 11, wherein the pattern is one of: a seasonality variation, a clustering effect, or a dependent process.

16. A system, comprising:
an event and alarm system; and
a computing device communicatively coupled to the event and alarm system, wherein the computing device is configured to:
receive process data from equipment at an industrial site over a period of time;
calculate a rate of change of a process variable associated with a process at the industrial site based on the process data;
update the rate of change of the process variable with the calculated rate of change;
store the updated rate of change of the process variable in memory of the computing device;
determine an alarm priority, an unsafe level, or an alarm limit based on the updated rate of change; and
transmit the alarm priority, the unsafe level, or the alarm limit to the event and alarm system; and
wherein the event and alarm system is configured to:
receive the alarm priority, the unsafe level, or the alarm limit; and
generate an alarm for the process based on the alarm priority, the unsafe level, or the alarm limit in real time during operation of the process.

17. The system of claim 16, wherein the event and alarm system is configured to compare the received alarm limit to an alarm limit.

18. The system of claim 17, wherein the event and alarm system is configured to reset the alarm limit to the received alarm limit responsive to the alarm limit and the received alarm limit being different.

19. The system of claim 16, wherein the event and alarm system is configured to compare the received alarm priority to an alarm priority.

20. The system of claim 19, wherein the event and alarm system is configured to update the alarm priority responsive to the alarm priority and the received alarm priority being different.

* * * * *